United States Patent [19]
Hashimoto

[11] Patent Number: 5,657,135
[45] Date of Patent: Aug. 12, 1997

[54] IMAGE READING APPARATUS FOR READING AN IMAGE CONTAINING BOTH A NEGATIVE AREA AND A POSITIVE AREA

[75] Inventor: Yoshiyuki Hashimoto, Machida, Japan

[73] Assignee: Minolta Camera Kabushiki Kaisha, Osaka, Japan

[21] Appl. No.: 53,266

[22] Filed: Apr. 28, 1993

[30] Foreign Application Priority Data

May 1, 1992 [JP] Japan ................... 4-112521

[51] Int. Cl.$^6$ .................. H04N 1/387; G03B 17/24
[52] U.S. Cl. ............. 358/453; 358/452; 358/296; 396/311; 396/429
[58] Field of Search ................ 358/452, 453, 358/457, 296; 348/96, 97, 107, 110, 112; 382/309, 317; 355/266, 267, 268, 273, 122, 123; 354/125, 334; 396/311, 429

[56] References Cited

U.S. PATENT DOCUMENTS

| | | | |
|---|---|---|---|
| 4,174,174 | 11/1979 | Hunter, Jr. | 355/39 |
| 4,482,225 | 11/1984 | Moyroud et al. | 396/559 |
| 4,727,399 | 2/1988 | Matsumoto | 355/41 |
| 4,745,489 | 5/1988 | Kashiwagi et al. | 358/296 |
| 4,750,044 | 6/1988 | Nakajima | 358/280 |
| 4,839,696 | 6/1989 | Ohtani | 355/218 |
| 4,875,768 | 10/1989 | Hirasawa | 353/27 |
| 4,903,141 | 2/1990 | Morton et al. | 358/448 |
| 4,963,923 | 10/1990 | Kusano et al. | 355/68 |
| 4,967,235 | 10/1990 | Sanbayashi | 355/271 |
| 4,969,053 | 11/1990 | Outa et al. | 358/458 |
| 4,974,096 | 11/1990 | Wash | 348/96 |
| 5,260,804 | 11/1993 | Fukutomi et al. | 358/453 |
| 5,272,764 | 12/1993 | Bloomberg et al. | 358/453 |
| 5,335,029 | 8/1994 | Itoh | 396/311 |
| 5,383,035 | 1/1995 | Suzuki | 358/453 |
| 5,412,773 | 5/1995 | Carlucci et al. | 348/97 |
| 5,416,605 | 5/1995 | Hideshima | 358/451 |
| 5,537,172 | 7/1996 | Amano | 396/311 |

FOREIGN PATENT DOCUMENTS

4-23676  1/1992  Japan.

Primary Examiner—Edward L. Coles, Sr.
Assistant Examiner—Madeleine A. V. Nguyen
Attorney, Agent, or Firm—Burns, Doane, Swecker & Mathis, LLP

[57] ABSTRACT

The image reading apparatus of this invention reads a desired image out of an original document with a CCD 1, edits a desired area of the thus read image with an edit processing part 4, and causes the edited area to be copied without being subjected to negative-positive inversion. The edit processing part 4 sets an optimum density severally for an area requiring negative-positive inversion and for an area not requiring negative-positive inversion. Thus, necessary information existing in the area of image and the area outside the image can be printed out without causing the formation of a completely black frame and density of the print can be optimized without discrimination between these areas.

23 Claims, 9 Drawing Sheets

IMAGE READING APPARATUS FOR READING AN IMAGE CONTAINING BOTH A NEGATIVE AREA AND A POSITIVE AREA

BACKGROUND OF THE ART

1. Field of the Invention

This invention relates to an image reading apparatus which is capable of reading an image containing both a negative area and a positive area and producing a positive image as an output.

2. Description of Related Art

In the conventional microfilm which has negative images recorded therein, when such a negative image is to be retrieved in the form of a copy from the microfilm, a completely black frame is produced outside the image area in consequence of the copying treatment because the copying area is generally wider than the image area.

Since this wholly black frame impairs the appearance of the produced copy as a document and involves a wasteful use of toner, various measures of improvement have been proposed. The invention disclosed in U.S. Pat. No. 4,839,696, for example, solves this problem by the adoption of a mode called "frame erasure."

The measures of improvement heretofore adopted for the conventional image reading apparatus are invariably directed to erasing the completely black frame. This mode of frame erasure, however, cannot be used where such information as frame number and date of photography which is placed within the area subjected to erasure, is to be produced as an output together with the image. As a natural consequence in this case, the completely black frame is formed around the image which is produced by copying. This situation must be taken for granted as an inevitable result.

SUMMARY OF THE INVENTION

This invention has been produced for the purpose of eliminating the problem mentioned above. The first object of this invention is to provide an image reading apparatus which is capable of producing necessary information existing inside and outside an image area as an output without involving the formation of a completely black frame.

The second object of this invention is to provide an image reading apparatus which is capable of setting several optimum exposure conditions for a negative-positive inversion area and a non-inversion area which are to be set to fulfill the object mentioned above.

DETAILED DESCRIPTION OF THE INVENTION

Figure 1:
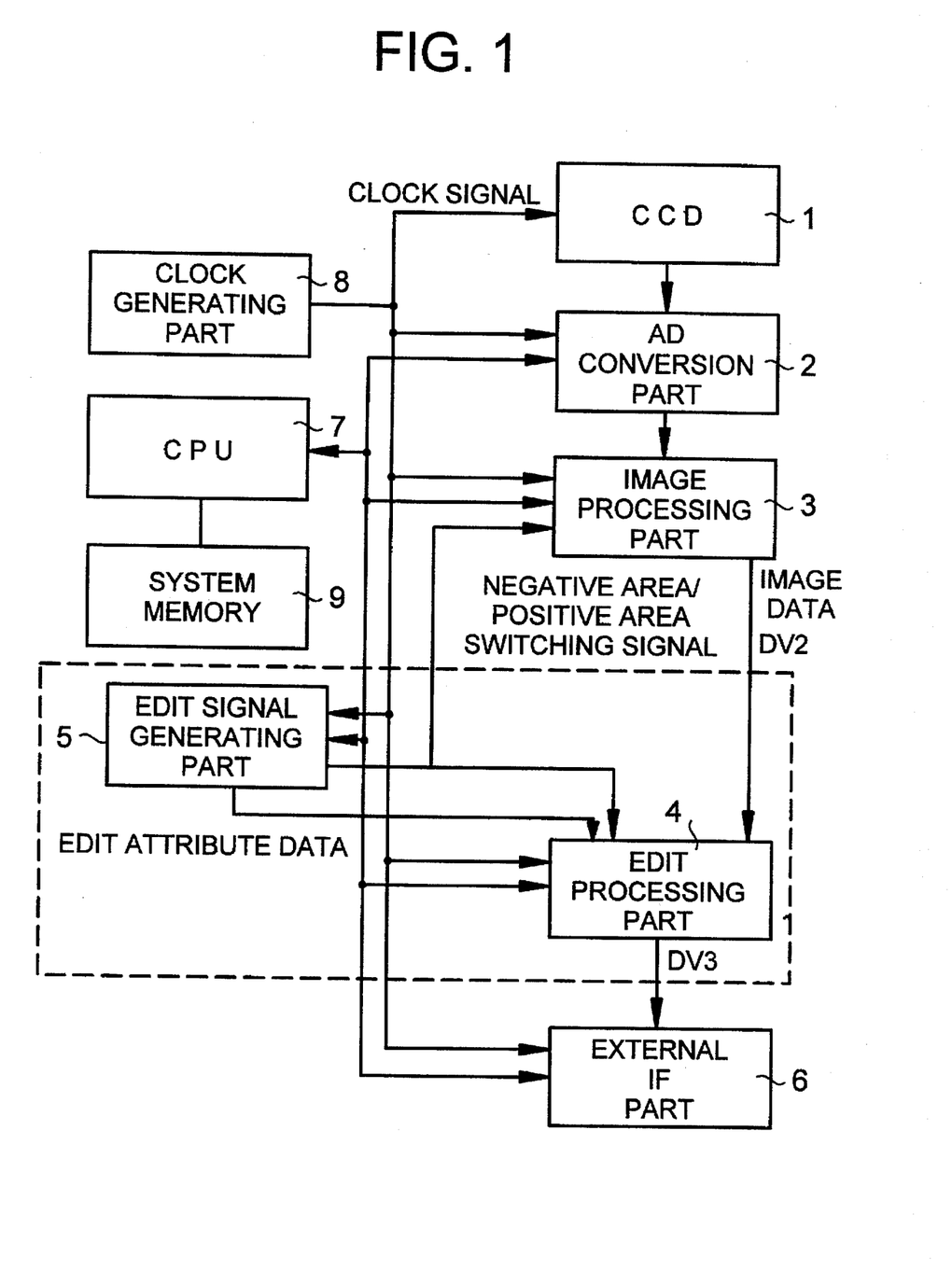
FIG. 1 is a block diagram illustrating schematically the construction of an image processing part of an image reading apparatus of this invention.

Now, this invention will be described in detail below with reference to the accompanying drawings. FIG. 1 is a block diagram schematically illustrating the construction of an image processing part of the image reading apparatus of this invention.

A CCD 1 is an element for converting a read image into an electrical signal. The signal emanating from the CCD 1 is injected into an AD conversion part 2 to be converted therein from an analog signal into a digital signal. The image which has been converted into the digital signal is introduced into an image processing part 3. Into the image processing part 3 is introduced a negative area/positive area switching signal which has been formed by an edit signal generating part 5. This switching signal is intended to provide, for a given area assigned to the image introduced into the image processing part 3, a designation as to whether this area is to be used for processing the image as a negative image or as a positive image.

The image processing part 3, performs on the introduced image, a treatment for improving the quality of the image and, at the same time, effects an area designation based on the aforementioned switching signal and puts out the treated image as image data to an edit processing part 4. In the edit processing part 4, the input image data are subjected to a negative-positive conversion treatment or a masking treatment which is performed in accordance with the edit attribute data output by the edit signal generating part 5 and then is further subjected to a treatment for binarization. The edit processing part 4 emits the image data resulting from these treatments to an external IF part 6.

The external IF part 6 transfers the introduced image data as output to an image output device such as a printer. A CPU 7 in the diagram controls the several operations of the parts which perform such image treatments as described above. A clock generating part 8 is adapted to produce a basic clock signal for the operations. A system memory 9 stores all data and programs that are necessary for the operation of the image reading apparatus. The operations of the various parts engaging in performing the image treatments, therefore, are controlled at a timing synchronized with the clock signal in accordance with an instruction from the CPU 7 output based on a program or data stored in the system memory 9.

Figure 2:
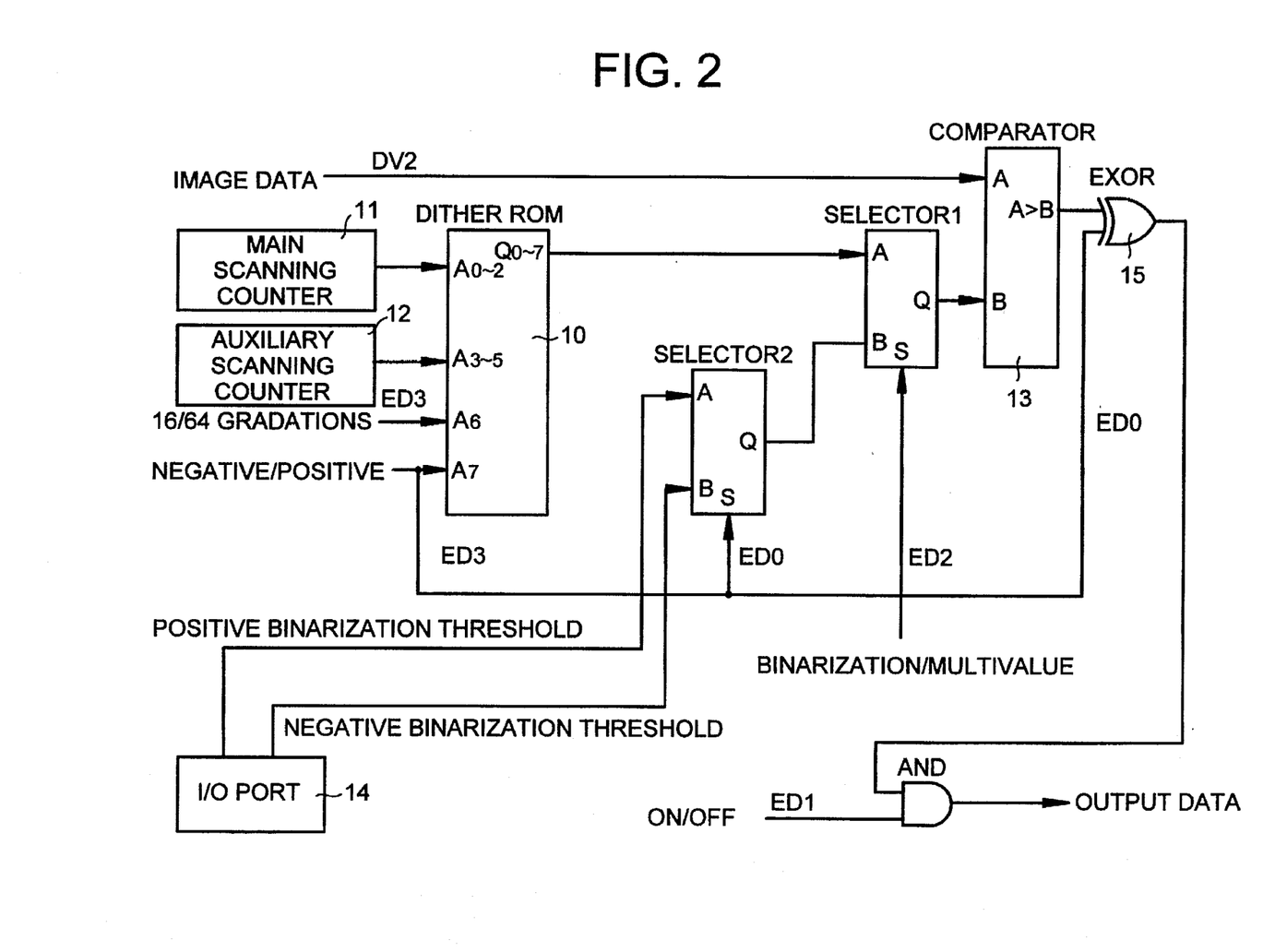
FIG. 2 is a diagram illustrating the construction of a detailed circuit within the part of FIG. 1 enclosed with a dotted line.

FIG. 2 is a diagram illustrating the construction of a detailed circuit for the edit processing part 4 shown in FIG. 1. This circuit serves the purpose of performing on an image area and other areas of the introduced image data, a treatment of binarization and a treatment for multivalue conversion each with a proper threshold thereby setting a proper density for each of the images in the desired areas.

A dither ROM 10 in the diagram is a circuit for generating an intermediate threshold for a false intermediate treatment of the image data. The choice between generation of a 16-gradation threshold and that of a 64-gradation threshold is effected with the signal of ED3 which is produced externally. The choice between binarization for the negative image and that for the positive image is effected with the signal of ED0 which is similarly produced externally. A main scanning counter 11 and an auxiliary scanning counter 12 are adapted for generating a 3-bit×3-bit digital signal corresponding to the intermediate threshold mentioned above. The threshold produced from this dither ROM 10 is transferred in the direction of a selector 1.

The selector 1 is adapted to select reference data to be output to a comparator 13 in the subsequent stage. This selection is made on the threshold for the multivalue conversion from the dither ROM 10 or the threshold for the binarization from the selector 2, on the basis of the binarization/multivalue conversion switching instruction produced externally. The selector 2 effects a switch between the positive binarization threshold and the negative binarization threshold introduced via an I/O port 14, depending on the ED0 signal mentioned above, and transfers the selected threshold to the selector 1.

The comparator 13 compares the threshold for binarization or multivalue conversion produced via the selector 1 with the level of the image data introduced therein and transfers only the image of the level surpassing the threshold to an EXOR circuit 15. In the EXOR circuit 15, an exclusive disjunction between the signal of ED0 and the image data is computed and the outcome of the computation is transferred to an AND circuit 16 at the subsequent stage. The fact that the signal of ED0 has been output indicates the continuation of a negative-positive inversion treatment on the image data in this circuit. The AND circuit 16 controls the output of the image data based on the ON/OFF signal for controlling the masking or the signal of ED1. When the signal of ED1 has not been output, all the image data output by the EXOR 15 is invalidated.

Figure 3:
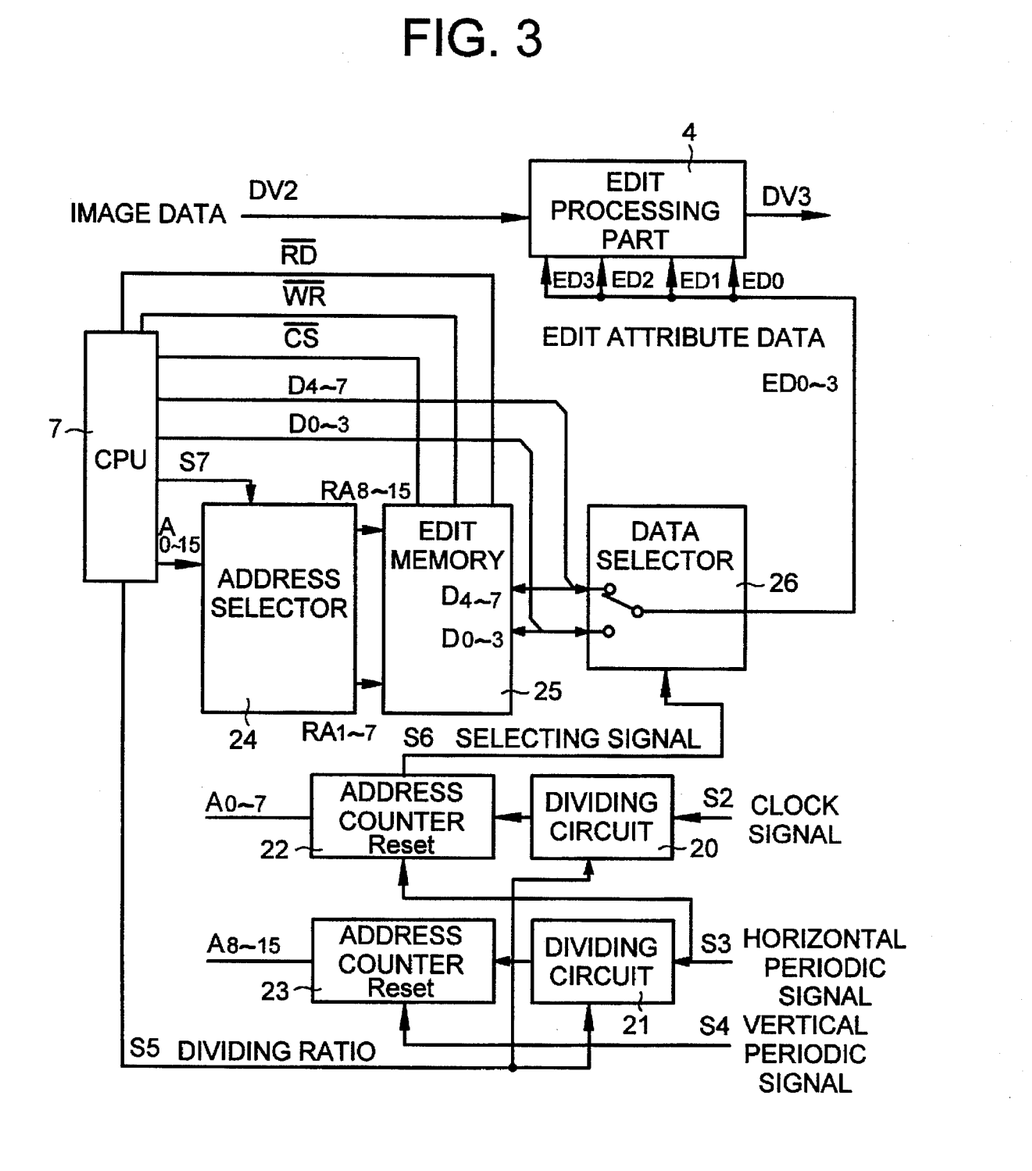
FIG. 3 is a block diagram illustrating a circuit which is used for generating a control signal required for the edit processing part shown in FIG. 2.

FIG. 3 represents a block diagram of a circuit adapted to generate the control signal or the edit attribute data necessary for the edit processing part 4 shown in FIG. 2. It is a detailed circuit diagram of the part of FIG. 1 enclosed with a dotted line.

The CPU 7 sets a dividing ratio for two dividing circuits 20 and 21. The dividing circuit 20 divides the clock signal output of the clock generating part of FIG. 1 in accordance with the dividing ratio and transfers the outcome of this division to an address counter 22. The dividing circuit 21 divides the horizontal periodic signal in accordance with the dividing ratio and transfers the outcome of the division to an address counter 23. The value of the count of the address counter 23 is reset each time a vertical periodic signal is output. The signals from the two address counters 22 and 23 are output to an address selector 24.

An edit memory 25 keeps in storage therein edit attribute data which are composed of data for negative-positive inversion, data for masking, switch data for binarization and multivalue conversion, and switch data for 16/64 gradations. The edit attribute data stored herein are transferred via a data selector 26 to the edit processing part 4 based on the address designation made by the address selector 24. The address designation made by the address selector 24 is effected based on the count values of the two address counters 22 and 23. The edit attribute data are stored at the addresses formed by the two address counters 22 and 23 and put out as synchronized with the clock signal.

When the contents of the edit memory 25 are to be rewritten, the address selector 24 is switched toward the CPU 7 side and the edit attribute data output of the CPU 7 are sequentially stored in the addresses corresponding to the address selector 24. Though the edit attribute data may be adapted so as to make one designation for each of the individual items of the image data, that of the present embodiment is adapted to make one designation for each of the portions of the image data corresponding to fixed areas of 1 mm$^2$ due to the capacity of the edit memory. In the edit processing part 4, therefore, the editing based on the edit attribute data is carried out on the input image data of a fixed area. To be more specific, various designations such as the designation of negative-positive inversion, the designation of negative-positive non-inversion, the designation of masking, and the designation of threshold for the binarization are effected for the image data corresponding to a fixed area.

The edit attribute data must be stored in the edit memory 25 before the image data are subjected to the edit treatment. Particularly, the threshold is set by carrying out a preliminary scanning on the image to be put in.

The image reading apparatus contemplated by this invention is constructed roughly as described above. For the purpose of setting the optimum density for both a negative area and a positive area in a multivalue image data, it is sufficient to use a circuit of FIG. 4 designed to output multivalue image data in a multiple of values in place of the circuit illustrated in FIG. 2.

Figure 4:
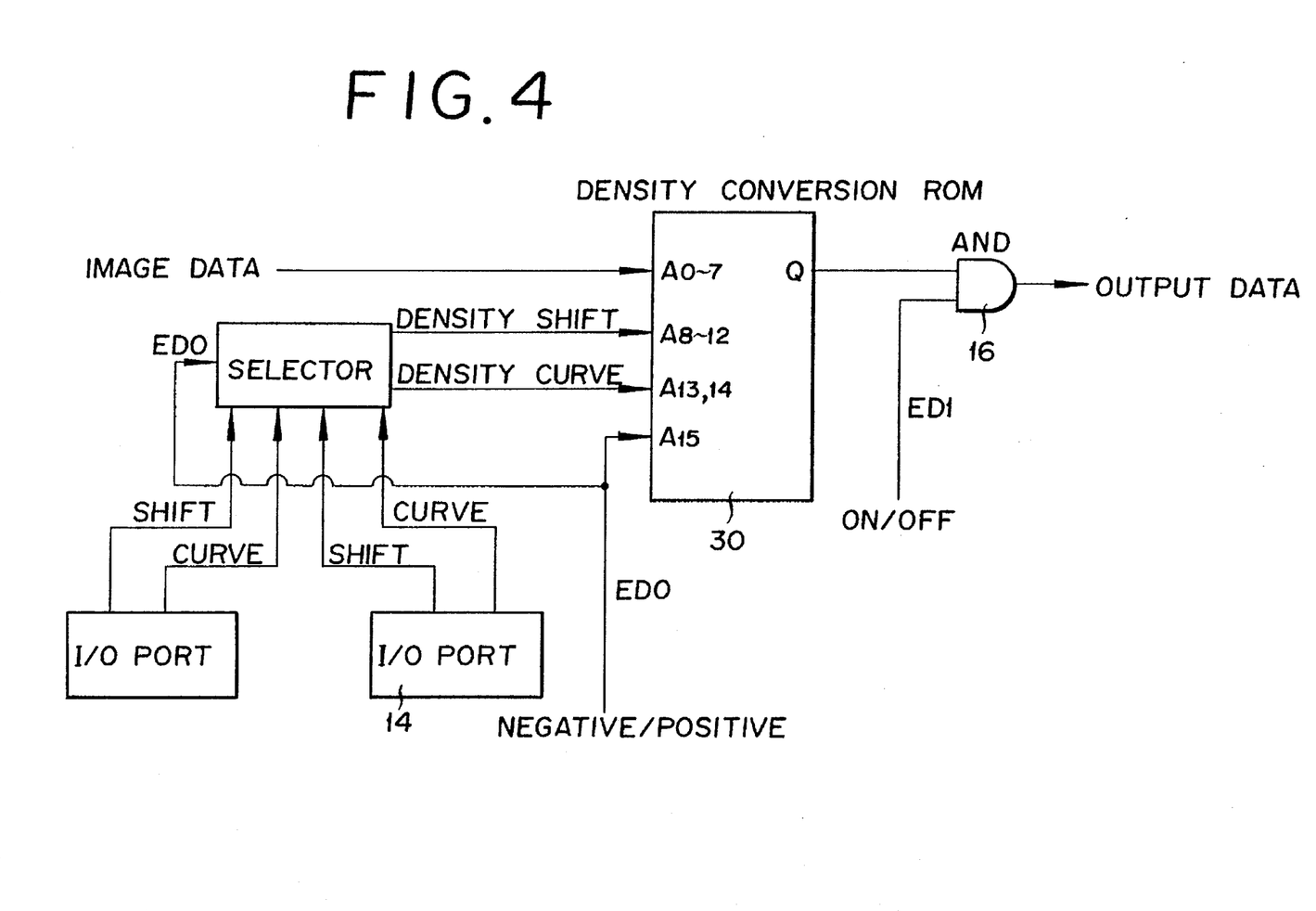
FIG. 4 represents a circuit for setting a negative area, a positive area, and an optimum density for multivalued image data.

This circuit uses a density conversion ROM 30 for the purpose of setting the optimum density for both a negative area and a positive area. For this density conversion ROM 30, a density shift and a density curve are designated via the I/O port 14. The term "density shift" refers to an act of shifting the density of an output image to the density of an input image and the term "density curve" refers to a curve of the output density relative to the input density set in accordance with the kind of input image, namely the image of the characters and the image of the photograph, etc.

Figure 5:
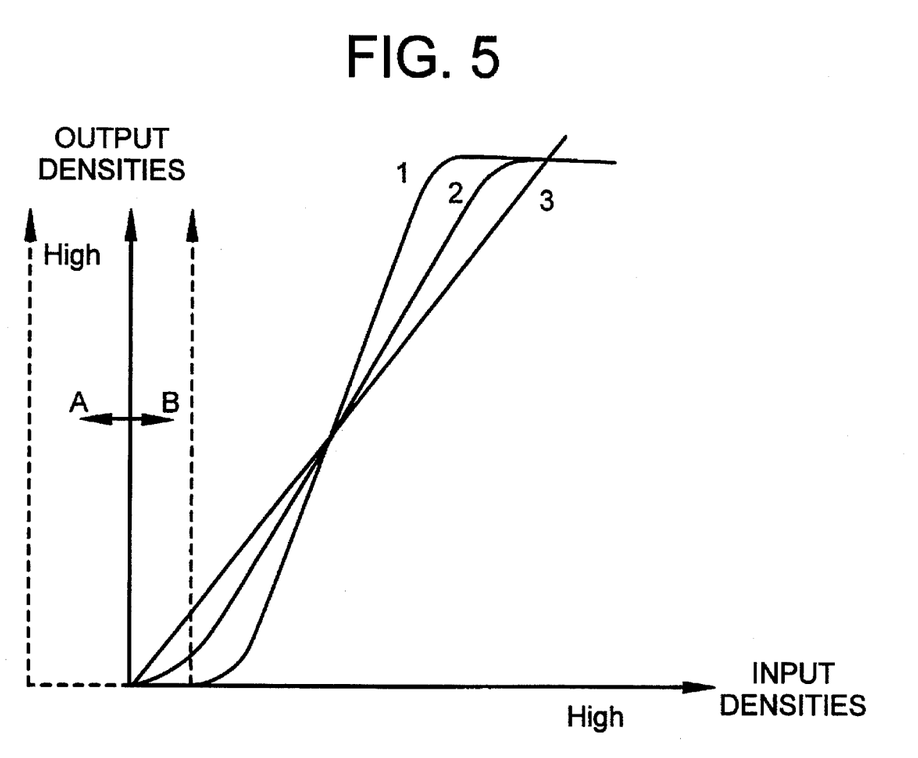
FIG. 5 is a diagram to assist the explanation of the density shift and the density curve to be set in the density conversion ROM shown in FIG. 4.

One example of the set of the density shift and density curve will be described below with reference to FIG. 5. In the diagram, the lines denoted by 1, 2, and 3 represent density curves for fixing output densities relative to input densities. When an input image is an image of characters, for example, density curves of the characteristics of 1 and 2 are selected and set in the density conversion ROM 30. When an input image is an image of photograph, a density curve of the characteristic of 3 is selected. The density shift varies the output density relative to the input density by shifting the axes of coordinates in the direction of A to B shown in the diagram. Thus, for the density conversion ROM 30, the settings mentioned above are designated.

In the density conversion ROM 30, the input image data are converted into portions of image data of the optimum density for each of the prescribed areas based on the instructions described above and negative-positive switch instructions. As a result, multivalue image data are formed. The image data whose negative area and positive area have been both adjusted for optimum density are transferred to the AND circuit 16. In the AND circuit 16, the masking treatment is performed in the same manner as described above on the image data output of the density conversion ROM 30 in accordance with the signal of ED1.

In the image reading apparatus of this invention, the treatment of the area outside the image area of the retrieved image (hereinafter referred to as "the outer frame") is performed based on the negative-positive inversion signal ED0 and the masking signal ED1. The position of this outer frame is determined by the data collected by the preliminary scanning action which precedes the main scanning action. The edit memory is set so as to effect negative-positive inversion of the outer frame determined. The thresholds for binarization of both the negative and positive areas or the density curves of the density conversion ROM are set so that the density of the inverted outer frame part will be optimized.

Figure 6:
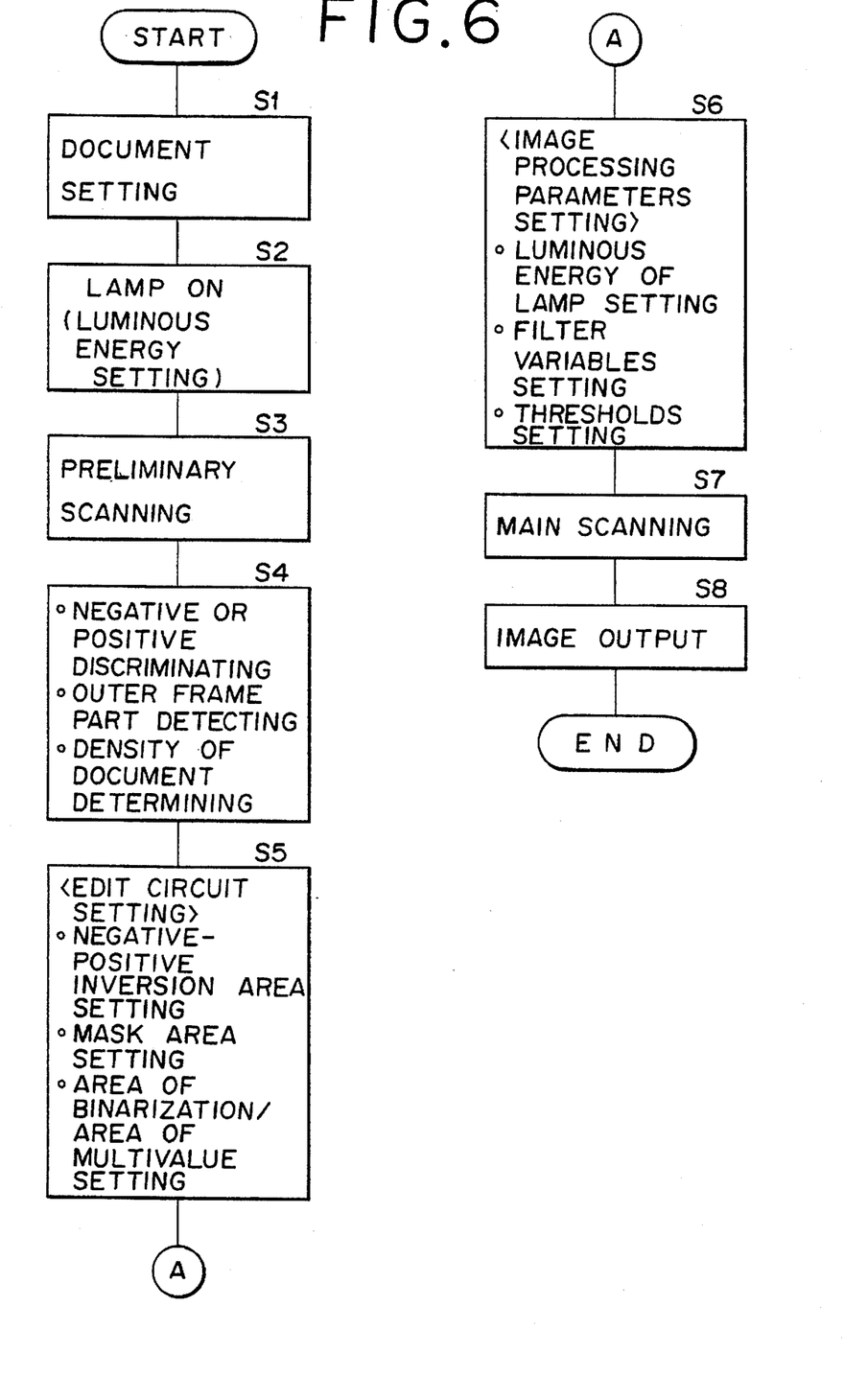
FIG. 6 is a flow chart indicating the operation of an image reading apparatus contemplated by this invention.

Now, the operation of the image reading apparatus of this invention will be described below with reference to the flow chart of operations illustrated in FIG. 6. First, an original document having the necessary images recorded therein is set in place in the apparatus (S1). Then, a lamp is set at a luminous energy (default value) for preliminary scanning and put into preliminary scanning motion. During this preliminary scanning, the image data read out of the original document by the CCD 1 are digitized by the AD converter 2 and put to storage in the image processing part 3. In other words, the data contained in the image area are sampled (S2 and S3) during the preliminary scanning operation. The CPU 7, based on the image data stored in the image processing part 3, discriminates whether the memorized image is a negative image or a positive image, detects an outer frame part, and further determines the density of the original document.

This detection of the outer frame part is specifically carried out as follows. First, the memorized image data are compared with a certain threshold. Then, the picture elements whose image data surpasses the threshold in each longitudinal row of images are counted to form a longitudinal array V (i) indicating the number of picture elements surpassing the threshold in the i'th longitudinal. row. Then, the position i at which "1" appears after a prescribed number of 0's have occurred in a row in the longitudinal array V (i) is taken as the horizontal coordinates axis of the boundary between the outer frame part and the image area. In the same manner, a horizontal array H (j) indicating the number of picture elements whose image data surpass the threshold in the j'th vertical row is formed to find the vertical coordinates axis of the boundary between the outer frame part and the image area. By the treatment described above, the coordinates of the four corners of the outer frame are determined (S4).

Figure 7:
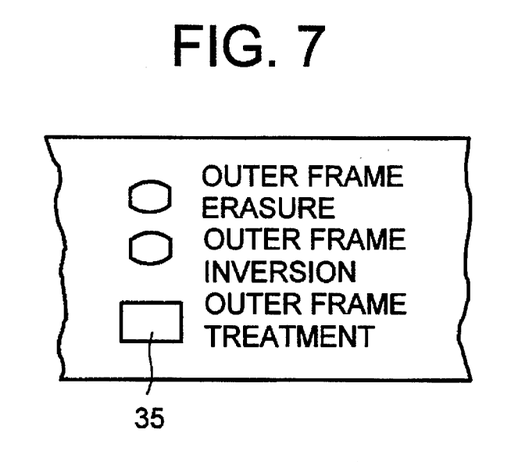
FIG. 7 is a diagram illustrating the appearance of an operating part for controlling the operations of the functions provided for the image reading apparatus of this invention.

Then, the CPU 7 proceeds to effect the following settings based on the position of the outer frame determined by the treatment described above and the manually set designation of the character/photograph area. The negative-positive inversion area is set based on the recognition of the negative area and positive area, the mask area is set based on the detection of the position of the outer frame, and the area of binarization (character) and the area of multivalue conversion (photograph) are set and further the area of 16 gradations and the area of 64 gradations are set based on the outcome of the determination of the density of the original document. Incidentally, the main body of this apparatus is provided with a manual switch 35 for the treatment of the frame as illustrated in FIG. 7. Three kinds of outer frame treatment can be selected by manipulation of this switch 35. A concrete example of the outer frame treatment will be described afterward (S5).

The CPU 7, based on the various kinds of data determined by the treatment of S4 and the various kinds of area set in S5, then computes various parameters for the purpose of performing the optimum image treatment on the picture element data stored in the image processing part 3. The parameters which are determined by the computation are stored as in the edit memory 25 illustrated in FIG. 3. The parameters include the luminous energy of the lamp used for the main scanning, the reference voltage of the AD conversion in the AD conversion part 2, the filter variables for emphasizing and smoothing edges, the electron variable power factor, the amount of motion of image, and the setting of thresholds, for example.

In this embodiment, the filter variables and the thresholds are so set as to be severally optimized in the negative area and positive area. To be precise, the setting of the negative-positive inversion area, the setting of the area for masking treatment, the setting of print densities for the negative and positive areas, and so on are carried out (S6).

In accordance with the parameters which have been set by the foregoing treatments, the image processing is carried out and the main scanning is simultaneously performed and the images read out consequently are produced as outputs (S7 and S8).

In the image reading apparatus of this invention which operates as described above, the following images can be produced by properly setting the switch 35 illustrated in FIG. 7.

Figure 8:
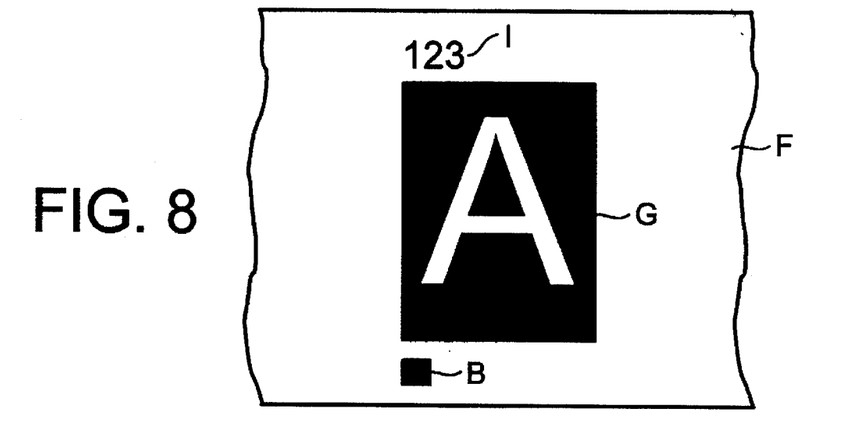
FIG. 8 is a diagram illustrating an image photographically stored in a microfilm.

Now, the present embodiment will be explained below with reference a microfilm in which a plurality of images are recorded by negative photography as illustrated in FIG. 8. In a microfilm F, an image G of a character A is recorded in the form of a negative photograph. In other words, the image is photographed, with the negative-positive status inverted. A blip mark B to be used for retrieval of the image is photographed in a left part below the image G and such image attribute information I as date of photography and frame number photographed in a left part above the image G.

Figure 9:
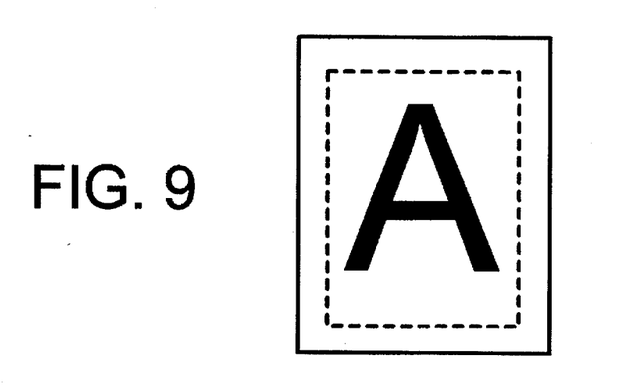
FIG. 9 is a diagram illustrating an image which is obtained when the image of FIG. 8 is copied with the treatment of frame erasure.

For the purpose of copying the image of this type, the switch 35 of FIG. 7 is manipulated and set so that only the outer frame erasure treatment will be executed. As a result, the attribute information and other data contained in the outer frame part are invariably masked and only the area of the image G is inverted and copied as illustrated in FIG. 9. Thus, the outer frame part ceases to exist in the copying medium and the style of the copied image can be improved and, at the same time, the amount of the toner consumed can be reduced. In this case, since the area of the image G and the area of the outer frame part have separately set copy densities, both the areas are vested with an optimum density.

Figure 10:
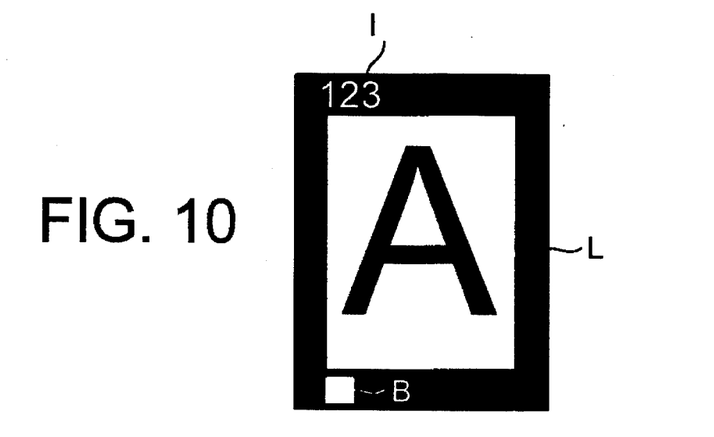
FIG. 10 is a diagram illustrating an image which is obtained when the image of FIG. 8 is copied without the frame erasure treatment.

When the operation of the switch 35 is wholly omitted and neither the outer frame erasure nor the outer frame inversion is designated, all the introduced images are copied as inverted, a completely black outer frame L as illustrated in FIG. 10 is produced as a copy around the area of the image G. Further, since the blip mark B and the attribute information I of the image which are present in the area of the outer frame are copied as inverted, a totally void image is copied in the outer frame. In the conventional apparatus, when the attribute information of the image is required to remain in the copied images, the formation of such copied images as mentioned above has been inevitable because priority is placed on this necessity rather than on the presence of the outer frame.

Figure 11:
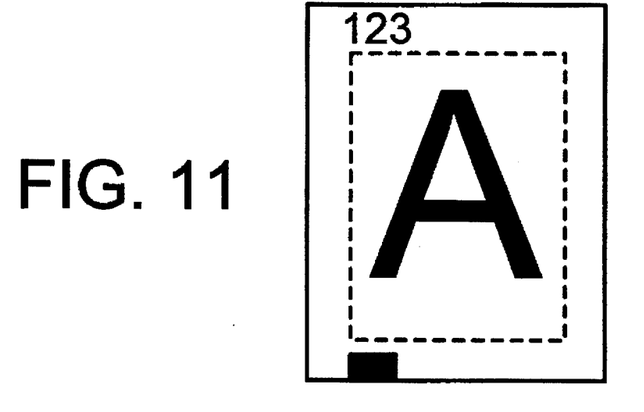
FIG. 11 is a diagram illustrating an image which is obtained when the image of FIG. 8 is copied such that the area of the outer frame is subjected to the negative-positive non-inversion treatment.

A copied image as illustrated in FIG. 11 can be obtained by setting the status of the outer frame inversion with the switch 35 of FIG. 7 and consequently inverting the negative-positive status of the detected outer frame. Thus, the attribute information I in the outer frame part can be copied as well as the image G by effecting the negative-positive inversion treatment on the image data in the area of image G and not on the image data in the detected outer frame part. This function can be utilized for obtaining the attribute information I without causing the formation of a completely black outer frame and consequently reducing the amount of the toner consumed.

Figure 12:
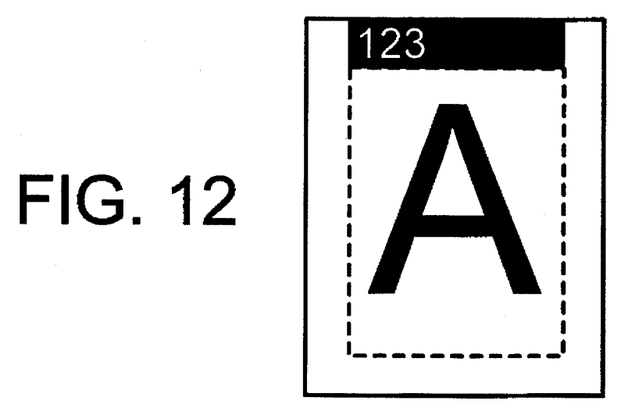
FIG. 12 is a diagram illustrating an image which is obtained when the image of FIG. 8 is copied such that the area of the outer frame except for part thereof is subjected to a masking treatment.

The desire to include the attribute information I in the copied image by using the masking treatment while repressing the consumption of toner is fulfilled by setting the masking area so as to exclude the part in which the attribute information I has been photographed as illustrated in FIG. 12. In this case, however, though the completely black frame can be limited to only a part, the attribute information I is displayed with totally void characters.

Figure 13:
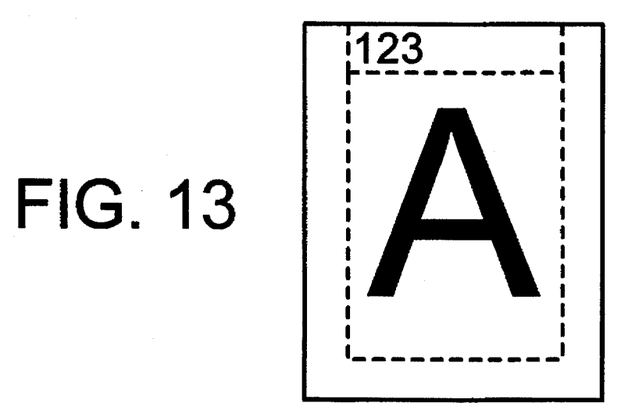
FIG. 13 is a diagram illustrating an image which is obtained when the image of FIG. 8 is copied such that the area of the outer frame except for part thereof is subjected to a masking treatment and the part excluded is subjected to the negative-positive non-inversion treatment.

For the purpose of preventing the attribute information I from being displayed in totally void characters, it is sufficient to avoid effecting the negative-positive inversion treatment exclusively with respect to the part of the attribute information I. By so doing, it is able to obtain such a copied image as illustrated in FIG. 13, prevent an unnecessary blip mark from being copied, and preclude black spots generally present in the area of outer frame of a microfilm or inevitable noises such as dust and a scratch on the film from appearing in the copied image. To be specific, in the copied image of FIG. 11, the area in which the negative-positive inversion is not effected is such as to preclude the possibility of a blip mark and noise from being copied in the area of outer frame.

Figure 14:
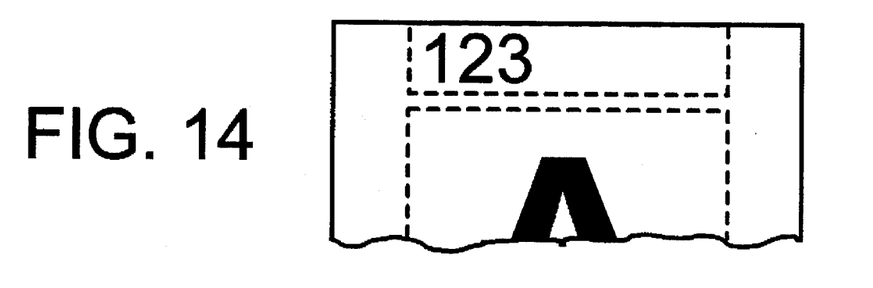
FIG. 14 is a diagram illustrating an image which is obtained when the image of FIG. 8 is copied such that the area of the outer frame is subjected to the negative-positive non-inversion treatment and the boundary between this area and the area subjected to a negative-positive inversion treatment is subjected to a masking treatment.
Figure 15:
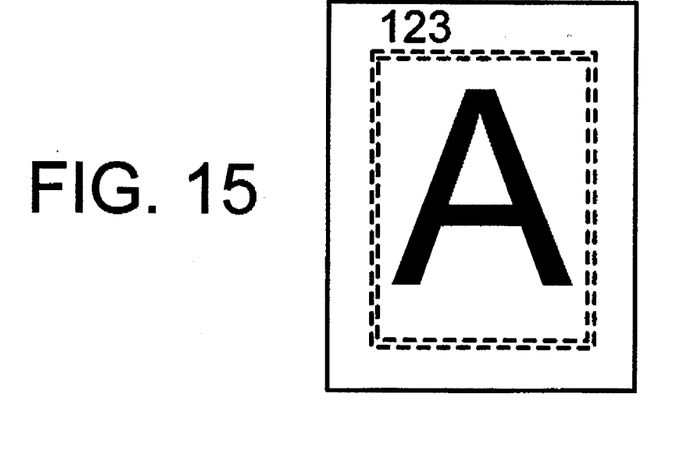
FIG. 15 is a diagram illustrating an image which is obtained when the image of FIG. 8 is copied such that the area of the outer frame subjected to the negative-positive non-inversion treatment and the boundary between this area and the area subjected to the negative-positive inversion treatment is subjected to the masking treatment.

FIG. 14 and FIG. 15 illustrate copied images which are obtained when the switch 35 is set for the two functions of outer frame erasure and outer frame inversion. By this setting, an area for the masking treatment is formed in the boundary between the area for the treatment of negative-positive inversion and the area for omitting the treatment of negative-positive inversion. This measure can preclude the otherwise possible occurrence of a line along the boundary between the area for the treatment of negative-positive inversion and the area for omitting the treatment of negative-positive inversion. The occurrence of this line along the boundary is due to to the discrepancy between the positions in which the two areas are set and the positions of the negative image and positive image in the actual film image.

As described above, in the present embodiment, the switch 35 on being suitably set allows selection of various modes of copying, enables the attribute information I photographed in the area of the outer frame to be copied without causing the formation of a completely black part, ensures production of a copied image of improved appearance, and warrants a saving in the consumption of the toner.

The embodiment described thus far represents a case of effecting selection of modes of copying by the use of the switch 35. This invention is not limited to the use of this particular switch. Optionally, this selection may be effected by means of a dip switch which is provided for the apparatus. Alternatively, the selection under discussion may be effected by means of a memory switch, a command setting, or a mode changeover switch. It is likewise permissible to provide for the apparatus with a switch which is capable of selecting the part above and the part below the area for omitting the treatment of negative-positive inversion, depending on the question whether the attribute information I exists on or beneath the image G.

The embodiment cited above has presumed use of a negative film as an original document. This invention naturally allows use of a positive film instead as an original document. In the positive film, the area of image possesses the positive characteristic and the outer frame part possesses the negative characteristic. For the sake of this invention, therefore, it suffices to avoid the negative-positive inversion for the area of image and effect the negative-positive inversion for the outer frame part.

What is claimed is:

1. An image reading apparatus comprising:
    an image reader which reads an original document and produces image data indicating the density of each of the picture elements of said original document,
    an inverter which inverts said image data,
    discriminating means for discriminating between an image area and an outer frame thereof in said original document,
    a controller which controls said inverter so as to invert only a selected part of the image data, said selected part corresponding to one of said image area and said outer frame, and
    output means for outputting said image data which includes both said image area and said outer frame, wherein only the selected part of said outputted image data corresponding to either said image area or said outer frame is inverted by said inverter.

2. An image reading apparatus according to claim 1, which further comprises masking means for masking a minute area including the boundary between said image area and said outer frame.

3. An image reading apparatus according to claim 1, wherein said original document is a film.

4. An image reading apparatus according to claim 3, wherein said original document has a plurality of images recorded therein and said outer frame has recorded therein additive information corresponding to the relevant individual image area.

5. An image reading apparatus according to claim 4, which further comprises means for masking the area of said outer frame excluding the area having said additional information recorded therein.

6. An image reading apparatus according to claim 1, wherein said original document is a negative film and said controller controls said inverter so as to effect inversion of the image data corresponding to said image area.

7. An image reading apparatus according to claim 6, wherein said outer frame has additive information recorded therein in the form of a positive image.

8. An image reading apparatus according to claim 1, wherein said original document is a positive film and said controller controls said inverter so as to effect inversion of the image data corresponding to said outer frame.

9. An image reading apparatus according to claim 8, wherein said outer frame has additive information recorded therein in the form of a negative image.

10. An image reading apparatus according to claim 1, wherein said discriminating means discriminates between said image area and said outer frame, based on the image data produced from said image reader.

11. An image reading apparatus comprising:

an image reader which reads an original document and produces image data indicating the density of each of the picture elements, designating means for designating a designated area in said original document, an inverter which inverts either only image data of the designated area or only image data outside of the designated area, an image processor which processes said image data of the designated area and said image data outside of the designated area depending on whether the image data is inverted by said inverter or is not inverted by said inverter, and output means for outputting said image data which comprises both the image data of the designated area and the image data outside of the designated area, wherein only said outputted image data corresponding to either of said image data of the designated area or the image data of outside the designated area is inverted by said inverter.

12. An image reading apparatus according to claim 11, wherein said designating means discriminates between an image area and an outer frame thereof in said original document based on the image data produced from said image reader, and designates said image area in accordance with the outcome of said discrimination.

13. An image reading apparatus according to claim 12, wherein said outer frame has recorded therein additive information corresponding to said image area.

14. An image reading apparatus according to claim 12, wherein said original document is a negative film and said designating means designates said image area.

15. An image reading apparatus according to claim 12, wherein said original document is a positive film and said designating means designates said outer frame.

16. An image reading apparatus according to claim 11, wherein said image reader is operated for designating said area and for setting operation conditions of the image processor, and is operated again for inverting either image data of the designated area or image data outside the designated area and for outputting said image data which comprises the image data of the designated area and the image data outside of the designated area.

17. An image reading apparatus according to claim 11, wherein said image processor has the function of binarizing said image data.

18. An image reading apparatus according to claim 11, wherein said image processor has the function of performing a dither treatment on said image data.

19. An image reading apparatus according to claim 11, wherein said image processor has the function of correcting the gradation of multivalue image data in accordance with a density curve.

20. An image reading apparatus comprising:

input means for introducing image data, an inverter which inverts said image data which is introduced by said input means, discriminating means for discriminating between data corresponding to an image area and data corresponding to an outer frame thereof in said image data, and a controller which controls said inverter so as to selectively effect inversion of only a selected part of the image data, said selected part corresponding to only said image area or only the image data corresponding to said outer frame, and output means for outputting said image data which includes both said image area and said outer frame, wherein only the selected part of said outputted image data is inverted by said inverter.

21. An image processing apparatus according to claim 20, wherein said input means comprises image reader which reads an original document and produces image data.

22. An image reading apparatus comprising:

an image reader which reads an original document and produces image data indicating the density of each of the picture elements, designating means for designating an area in said original document, an inverter which inverts either image data of only the designated area or only image data of outside of the designated area, an image processor which equalizes the image density of the output data corresponding to the designated area with the image density of the output data corresponding to the outside of the designated area, and output means for outputting the output data processed by said image processor, wherein said output data comprises both data of the designated area and data of the outside of the designated area.

23. An image reading apparatus according to claim 22, wherein said designating means discriminates an image area and an outer frame thereof in the original document based on the image data produced from said image reader and designates the image area in accordance with the outcome of said discrimination.

* * * * *